United States Patent [19]

Biancale

[11] Patent Number: 5,145,230
[45] Date of Patent: Sep. 8, 1992

[54] TARPAULIN COVER

[76] Inventor: Vito Biancale, #461, Hwy. #5, R.R. #2, Dundas, Ontario, Canada, L9H 5E2

[21] Appl. No.: 742,912

[22] Filed: Aug. 9, 1991

Related U.S. Application Data

[63] Continuation-in-part of Ser. No. 152,623, Feb. 5, 1988, Pat. No. 5,067,767.

[51] Int. Cl.⁵ .............................................. B60J 7/02
[52] U.S. Cl. .................................................... 296/100
[58] Field of Search ............... 296/100, 101, 98, 105

[56] References Cited

U.S. PATENT DOCUMENTS

| | | | |
|---|---|---|---|
| 2,469,958 | 5/1949 | Fowler | 296/105 |
| 4,067,603 | 1/1978 | Fenton | 296/100 |
| 4,189,178 | 2/1980 | Cramaro | 296/100 X |
| 4,215,897 | 8/1980 | Aiken et al. | 296/100 |
| 4,281,872 | 8/1981 | Biancale | 296/100 |
| 4,854,630 | 8/1989 | Biancale | 296/100 |

Primary Examiner—Margaret A. Focarino
Assistant Examiner—Joseph D. Pape
Attorney, Agent, or Firm—Kane, Dalsimer, Sullivan, Kurucz, Levy, Eisele and Richard

[57] ABSTRACT

An improved tarpaulin cover system for truck bodies wherein intermediate portions of the tarpaulin between its ends are slidably secured for longitudinal movement with respect to the truck body on a pair of semi-rigid, non-movable linear fixed support members, the semi-rigid support members being separate and distinct from the movable drive cable by which the lead bow and tarpaulin are moved. The system is adaptable to both truck box and flat deck trailer type bodies. The system according to the present invention makes the tarpaulin system more wind resistant than conventional movable tarpaulin cover systems and provides more safety by maintaining the tarpaulin in position even if the drive cable breaks.

5 Claims, 2 Drawing Sheets

TARPAULIN COVER

This application is a continuation-in-part in respect of my U.S. application Ser. No. 152,623 filed Feb. 5, 1988, now U.S. Pat. No. 5,067,767.

BACKGROUND OF THE INVENTION

This invention relates to an improved tarpaulin cover system for open-top truck bodies.

Movable tarpaulin cover systems for truck boxes or trailers of the type including a floor, front wall and a pair of upright side walls and/or flatbed trailers are known in the prior art. See, for example Cramaro Canadian Patent No. 995,714 issued Aug. 24, 1976 and Biancale Canadian Patent No. 1,094,129 issued Jan. 20, 1981. In such systems, one end of a tarpaulin to cover the truck body is anchored to the front wall. A plurality of intermediate support bows extend in parallel fashion from side-to-side transversely across the truck body, the bows being secured at spaced locations to the tarpaulin. The ends of the intermediate bows are slidably secured on a movable cable for longitudinal movement with respect to the truck body. A lead bow extending parallel to the intermediate bows from side-to-side transversely across the truck body is secured to the free end of the tarpaulin. The ends of this bow are secured to the movable cable for movement therewith longitudinally with respect to the truck body. When the cable is moved in one direction, the lead bow and free end of the tarpaulin are drawn longitudinally to the back end of the truck body and the intermediate bows and tarpaulin are drawn proportionately rearwardly as required to cover the truck body. When the cable is moved in the opposite direction, the lead bow, intermediate bows and tarpaulin are retracted to the front end of the truck body to open position. In Biancale Canadian Patent No. 1,094,129, a single drive cable is provided with a pair of horizontal reaches of the cable extending along parallel to and above each of the upper edges of the box, the cable being in the form of a closed or endless loop mounted on pulleys attached to the truck box. A pair of the runs of the cable cross over each other from one side of the box to another in a region disposed below the upper edges of the box so that movement of the cable along its path causes each of the pair of horizontal reaches to move in the same direction relative to the upper edges of the box to effect movement of the tarpaulin. The cable is moved by means of a winch.

In Cramaro Canadian Patent No. 995,714, a pair of cables, one on each side of the truck box are provided, each cable providing one of the pair of horizontal reaches of the cable extending along parallel to and above each of the upper edges of the box. The two cables are simultaneously winched for movement.

Such conventional prior art systems have presented several problems in operation. Firstly, such systems have not reacted well to the winds generated during normal motion of the truck on which they have been installed. Such wind has caused the bows to bend out of position and cause wear and tear on the cable. As a result, the tarpaulin has required strapping to the truck body to keep it taut and in position. As well, there is additional wear on the cable since the intermediate bows have their ends slidably secured to it.

Another danger exists if the drive cable on such a conventional system breaks. The tarpaulin and bow will then be released from the truck resulting in a potentially hazardous situation particularly if the truck is in transit.

U.S. Pat. No. 3,231,305 of Beckman issued Jan. 25, 1966 describes and illustrates a collapsible cover assembly for vehicles, on which the ends of the bows are mounted on sleeves which travel horizontally on a pair of rigid, tubular tracks mounted on either side of the truck body. While such a system may be suitable for a pick-up truck or the like, for which it was intend, it would not be suitable for a larger truck trailer. On larger truck trailer there would inevitably be a sag in the track which would make the sleeves very difficult or impossible to move. As well, such a system could not withstand the normal abuse to which a cargo trailer for a truck would be subject in loading and unloading, where inevitably such a track would occasionally be hit by the loading vehicle and bent or damaged, again further interfering with proper sliding of the sleeves.

Other patents of general background interest relating to tarpaulin cover systems for trucks are described and illustrated in Pickering et al U.S. Pat. No. 4,032,186 issued Jun. 28, 1977 and Rodrigue Canadian Patent No. 1,107,790 issued Aug. 25, 1981.

It is an object of the present invention to provide an improved tarpaulin cover system for trucks which to some extent avoids or minimizes the problems of conventional systems with wind. It is a further object of the present invention to provide such a tarpaulin cover system for use on commercial truck bodies such as flat deck trailers and truck boxes, which system has increased safety.

SUMMARY OF THE INVENTION

In accordance with the present invention there is provided an improved arrangement for a tarpaulin cover system for open-top bodies of trucks or trailers, the system being of the type comprising a tarpaulin having a front end anchored to the body front, and a rear end. A plurality of intermediate bows extend transversely across the body and is secured at spaced locations to the tarpaulin for supporting the tarpaulin. The intermediate bows have intermediate bow ends. A lead bow is secured to the rear end and has lead bow ends. A bow support means is provided for supporting the intermediate bows and lead bow. The bow support means is adapted for reciprocating the lead bow, thereby moving the tarpaulin and the intermediate bows between a covered position, wherein the body is covered by the tarpaulin and an open position wherein the body is open. The bow support system includes a pair of linear, semi-rigid cable members secured immovably to the body and extends longitudinally along the body, with the intermediate bow ends being slidably mounted and supported on the cable members for longitudinal movement; and separate, movable drive cable means for supporting the lead bow ends and having drive portions extending longitudinally along the body in parallel to the immovable cable means, the lead bow being fixedly secured to the movable drive cable means, whereby longitudinal movement of the movable drive cable means causes the lead bow to move for opening or closing the tarpaulin.

In a preferred embodiment of the present invention, the semi-rigid bow support members are cables immovably secured on each side of the body. The system according to the present invention may be applied to either box-type truck or trailer bodies or to flat deck trailers.

Since the tarpaulin cover system of the present invention has intermediate bows secured on semi-rigid bow support members which are separate and independent from the movable drive cable means, greater wind resistance of the system is provided. Where the semi-rigid bow support is a cable, it can be made more rigid than the drive cable to counter the effects of wind. Furthermore since this cable is not used to move the tarpaulin, it can be made thicker and stronger than the drive cable which must be trained around pulleys and hence more flexible. Moreover this cable supports the weight of the tarpaulin and hence does not need to be as flexible as the drive cable. The semi-rigid cable however must have some flexibility so that it will give somewhat in response to wind shear forces acting on the tarpaulin during movement. For example the cable may preferably be made from "bridge strand" stainless steel cable of, for example one-quarter inch diameter. Such a cable is formed from a number of smaller cables, and, while it will flex to some extent, is more rigid than normal cables. The drive cable, on the other hand, may for example be made of conventional aircraft cable or stainless steel cable, for instance of three-sixteenth to one-quarter inch diameter.

The system in accordance with the present invention provides significantly improved safety. For example, the intermediate bow supports do not slide on the drive cable and cause it to wear as in conventional systems. As well, if the drive cable of the present invention were to break during transit, the intermediate bows, being secured to the semi-rigid bow support members and not to the drive cable, would remain in position.

BRIEF DESCRIPTION OF THE DRAWINGS

These and other objects and advantages of the invention will become apparent upon reading the following detailed description and upon referring to the drawings in which.

Figure 1:
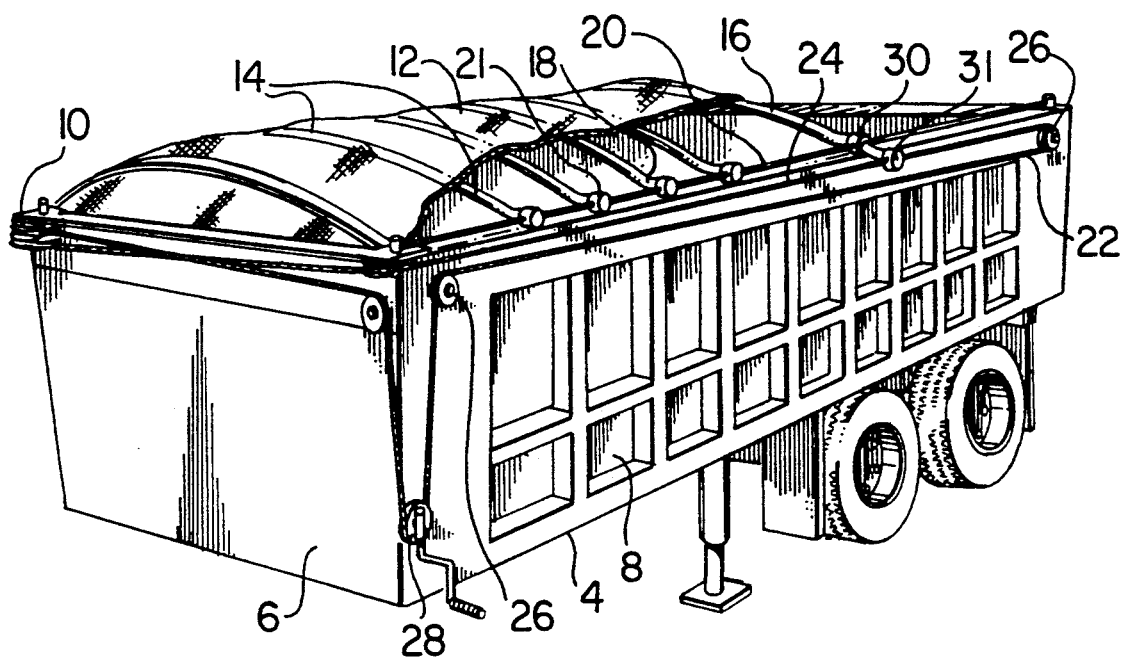
FIG. 1 is a perspective view of a box-type truck body, on which a tarpaulin cover system in accordance with the present invention has been mounted.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated a tarpaulin cover system in accordance with the present invention mounted on a truck body of the type including a floor 4, a front wall 6 and a pair of upright side walls 8, each of which define a generally horizontal upper edge 10. A tarpaulin 12 is supported by intermediate bows 14 and a lead bow 16 in a manner which will be described in more detail hereinafter. One end of tarpaulin 12 is secured to the top of front wall 6. Lead bow 16 is secured to the tarpaulin near its other, free end and intermediate bows 14 are secured at spaced, regular intervals to tarpaulin 12 as illustrated.

The ends 18 of intermediate bows 14 are slidably secured to, and supported by, a pair of cables 20, for example by means of sleeves or connectors 21 secured thereto, one cable immovably secured, in horizontal orientation, near the upper edge 10 of each of side walls 8 to act as a linear, non-moving semi-rigid bow support member. (A single cable 20 extending along each of these sides and across the front wall 6 may alternatively be used.)

Figure 2:
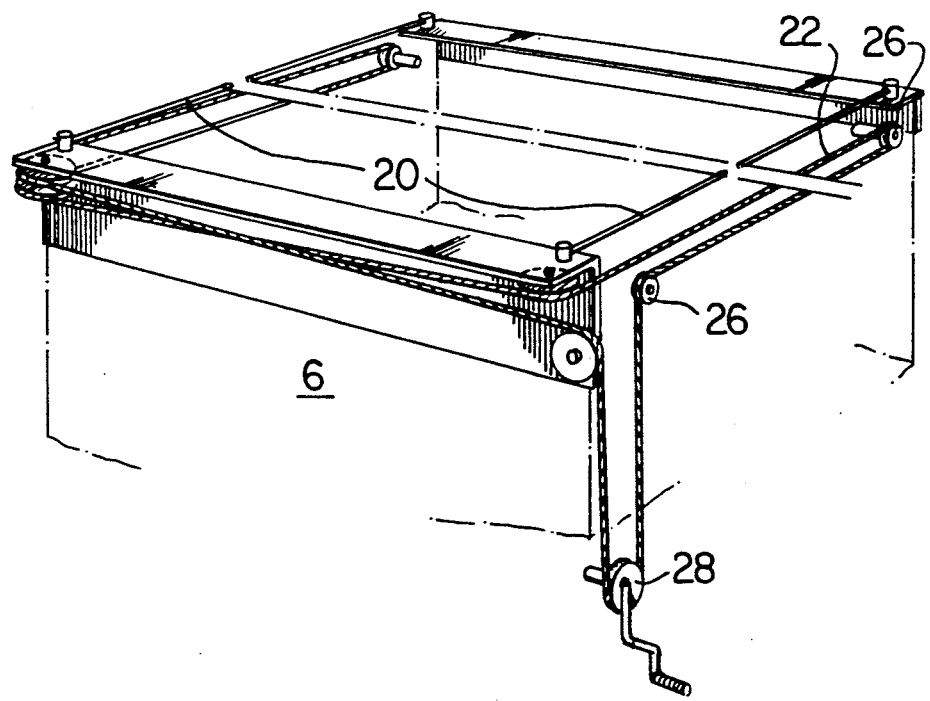
FIG. 2 is a schematic view of the movable cable system of the tarpaulin cover system of FIG. 1.

A second, drive cable 22 is installed with a pair of horizontal reaches 24 extending along parallel to cables 20. In the illustrated embodiment, a single cable as described and illustrated in Biancale Canadian Patent No. 1,094,129 is used, with the cable being mounted on a plurality of pulleys 26 attached to the truck body to support the runs of the cable and arranged with a pair of runs of the cable crossing over each other from one side of the truck body to the other below or at the front as illustrated in FIG. 2, so that movement of the cable along its path causes horizontal reaches 24 to move in the same direction relative to the upper edges 10. Cable 20 is thicker and stronger than drive cable 22 since cable 20 is supporting the weight of the tarpaulin and is not used to move the tarpaulin. An appropriate winch means 28 is provided for movement of drive cable 22. Lower ends 30 of lead bow 16 are fixedly secured, by an appropriate sleeve or connector and securing means 31, on either side of the truck body, to drive cable 22 as illustrated.

Alternatively, instead of a single drive cable 22, a pair of drive cables 22 (as described and illustrated in Cramaro Canadian Patent No. 995,714) operated by winch 28 may be mounted, one near the upper edge 10 of each of side walls 8, again with a horizontal run 24 of each of these cables extending parallel to corresponding cable 20 on each side wall 8.

Figure 3:
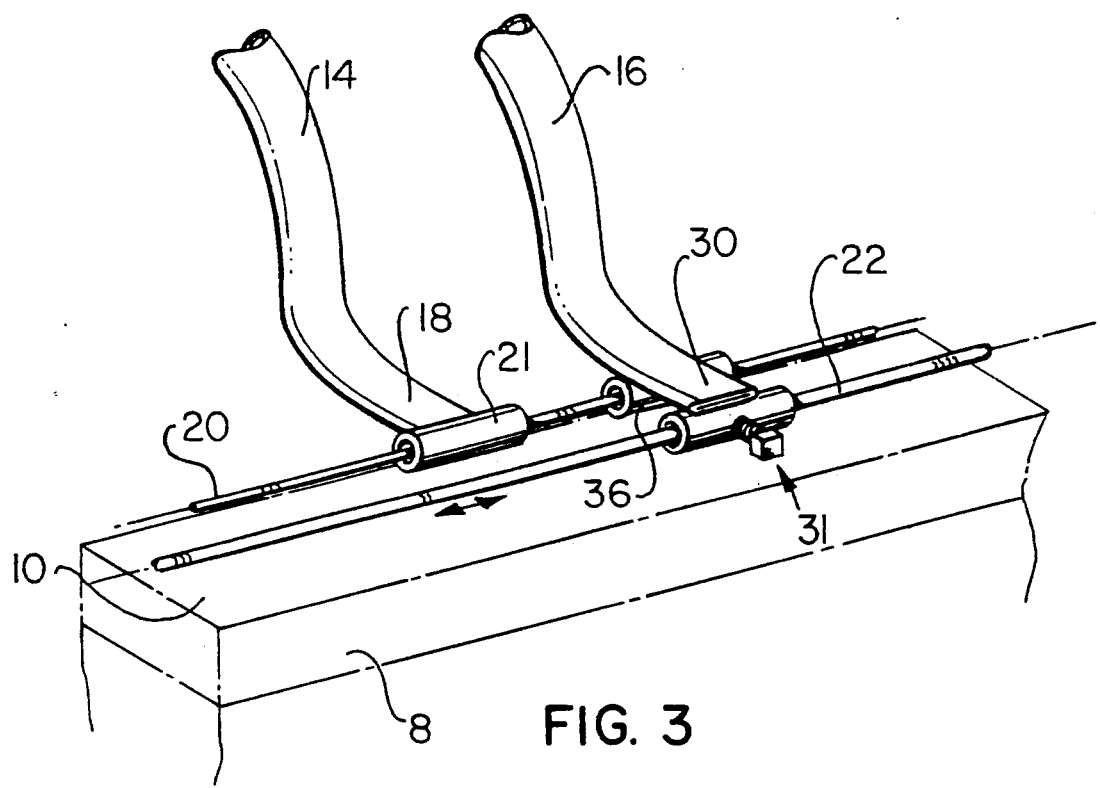
FIG. 3 is an enlarged detail perspective view of a portion of the tarpaulin cover system of FIG. 1.

Ends 30 of lead bow 16 are fixedly secured to drive cable 22 as illustrated in FIG. 3 to move at a similar speed a similar amount in a similar direction on each side of the truck body when the drive cable is activated by winches 28. It is preferred that lower ends 30 also each be slidably mounted on the corresponding cable 20, for example by an appropriate sleeve 36 secured thereto. This double sleeve arrangement at the ends 30 of lead bow 16 assists in restricting the pivoting movement of bow 16 in operation and during movement of the vehicle in which the system is mounted. When the drive cable 22 is moved in one direction, lead bow 16 and the free end of tarpaulin 12 are drawn to the back of the truck body. At the same time, each intermediate bow 14 and the associated portion of tarpaulin 12 to which it is secured slide rearwardly on cables 20 an amount dictated by the location across tarpaulin 12 at which each intermediate bow is secured. By moving the drive cable 22 in the opposite direction, lead bow 16, intermediate bows 14 and tarpaulin 12 are retracted towards front wall 6 to expose floor 4 of the truck body for loading purposes. This system enables the bows and tarpaulin to be "floated" on the semi-rigid cables 20, thereby requiring no rail or the like to support and guide the bows on upper edges 10.

Thus it is apparent that there has been provided in accordance with the invention a tarpaulin cover system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A tarpaulin cover system for an open-top truck or trailer bodies having a body front, the system comprising:
   (a) a tarpaulin having a front end and anchored to said body front, and a rear end;
   (b) a plurality of intermediate bows extending transversely across said body and secured at spaced locations to said tarpaulin for supporting said tarpaulin, said intermediate bows having intermediate bow ends;
   (c) a lead bow secured to said rear end and having lead bow ends; and
   (d) bow support means for supporting said intermediate bows and lead bow, said bow support means reciprocating said lead bow thereby moving said tarpaulin and said intermediate bows between a covered position wherein said body is covered by said tarpaulin and an open position wherein said body is open, said bow support system including:
      (i) a pair of linear, semi-rigid cable members secured immovably to said body and extending longitudinally along said body, with said intermediate bow ends being slidably mounted and supported on said cable members for longitudinal movement; and
      (ii) separate, movable drive cable means for supporting said lead bow ends and having drive portions extending longitudinally along said body in parallel to said immovable cable member, said lead bow being fixedly secured to said movable drive cable means, wherein the drive cable means consists of a single cable having a horizontal reach extending along each side of the body, the cable having the form of an endless loop with a path of travel defined by a series of elongated runs, said bow support means including a plurality of pulleys attached to the body to support said runs, with a pair of said runs crossing over each other from one side of the body to the other so that the movement of the drive cable along its path causes each of said pair of horizontal reaches to move in the same direction relative to the body to effect movement of the tarpaulin; whereby longitudinal movement of said movable drive cable means causes the lead bow to move for opening or closing said tarpaulin.

2. A tarpaulin cover system according to claim 1 wherein each of said trucks has two longitudinal sides and each of said linear semi-rigid cable members is fixedly secured along one of said longitudinal sides.

3. A tarpaulin cover system according to claim 1 wherein the body is a truck box of the type including a floor, a front wall and a pair of upright side walls each defining a generally horizontal upper edge, wherein horizontal reaches of the semi-rigid cable members and of the drive cable means extend in parallel, proximal to each of the upper edges of the box.

4. A tarpaulin cover system according to claim 2 wherein the drive cable means consists of a single cable having a horizontal reach extending along each side of the body, the cable having the form of an endless loop with a path of travel defined by a series of elongated runs, said bow supports means including a plurality of pulleys attached to the body to support said runs, with a pair of said runs crossing over each other from one side of the box to the other so that movement of the drive cable along its path causes each of said pair of horizontal reaches to move in the same direction relative to the body to effect movement of the tarpaulin.

5. A tarpaulin cover system according to claim 1 wherein the lead bow is additionally slidably mounted on the semi-rigid cable members.

* * * * *